May 14, 1968  K. W. KAMPERT ET AL  3,382,772

HYDRAULIC CYLINDER CONSTRUCTION

Filed June 7, 1966  2 Sheets-Sheet 1

INVENTORS
KEITH W. KAMPERT
KENNETH E. HOUTZ

Richard E. Backus

ATT'Y

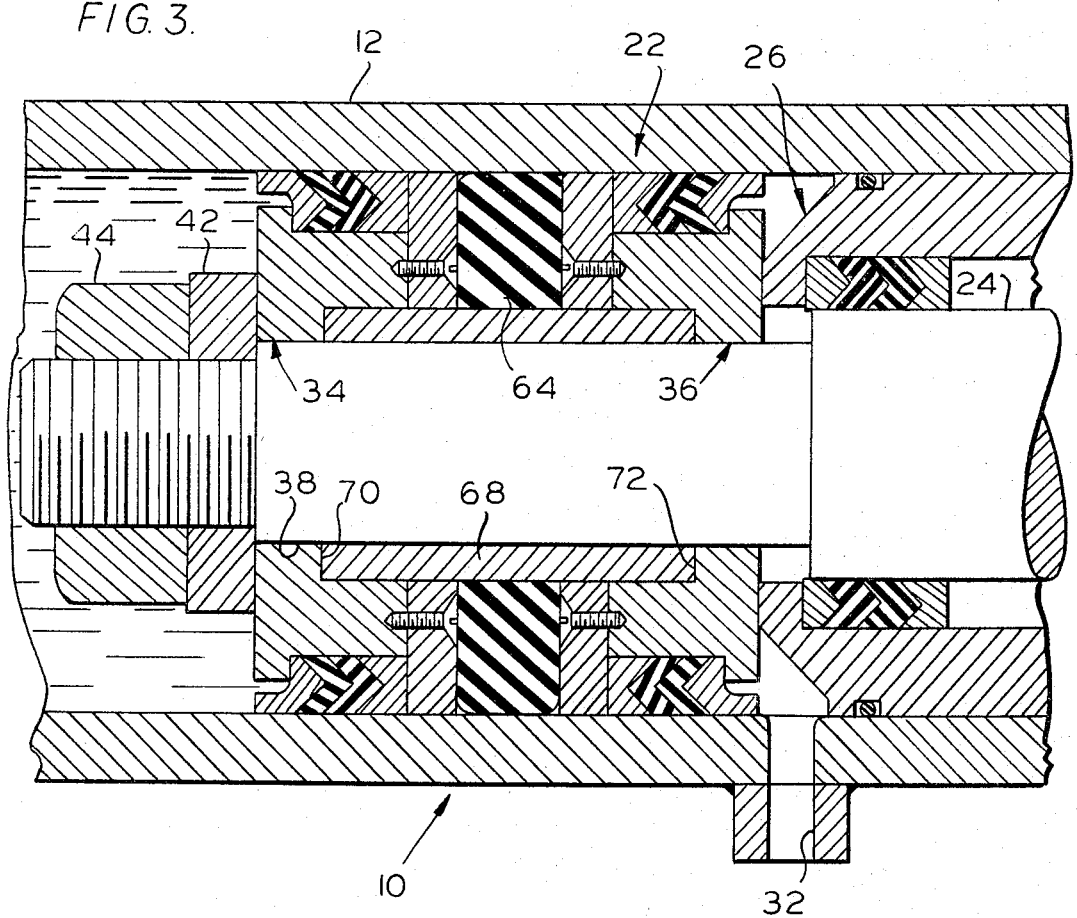

United States Patent Office 3,382,772
Patented May 14, 1968

3,382,772
HYDRAULIC CYLINDER CONSTRUCTION
Keith W. Kampert, Libertyville, and Kenneth E. Houtz, Streamwood, Ill., assignors to International Harvester Company, Chicago, Ill., a corporation of Delaware
Filed June 7, 1966, Ser. No. 555,728
10 Claims. (Cl. 92—84)

ABSTRACT OF THE DISCLOSURE

A piston head assembly including spaced piston head members movably mounted on a piston rod with a resilient member and a relatively movable stop member mounted between the piston head members.

This invention relates to hydraulic cylinders incorporating a novel piston head assembly and more particularly relates to hydraulic cylinders having a resilient piston head assembly effective to absorb both hydraulic and mechanical shock loads.

Hydraulic rams or cylinders are widely used with various implements and machines, such as for operating the loader mechanism on construction equipment and for pivoting the frame sections of an articulated vehicle. In order to move a large mass with the cylinder a high fluid pressure is required, and sudden application of this pressure within the cylinder will produce hydraulic shock loads on the piston head, resulting in undesirable shock forces on the linkages of the mechanism. Furthermore, mechanical shock loads will arise where, for example, the piston head and rod will be stressed at the end of the rod travel due to the inertial forces of the heavy load.

Accordingly, it is an object of this invention to minimize the effects of shock loads during the operation of an hydraulic cylinder by providing a novel piston head assembly incorporating sufficient resiliency to cushion the shock loads.

Another object is to provide a resilient piston head assembly for an hydraulic cylinder which is effective to cushion shock loads at both extended and retracted positions as well as any position along the stroke.

Another object is to provide a piston head assembly incorporating a resilient member positioned between a pair of half piston heads slidably mounted on the piston rod to yieldably cushion shock loads and in which means are provided to restrict travel of the piston heads with respect to the rod to limit yielding of the resilient member.

These and other objects of the present invention will become apparent to those skilled in the art when the following specification is read in conjunction with the accompanying drawings, wherein.

Figure 1:
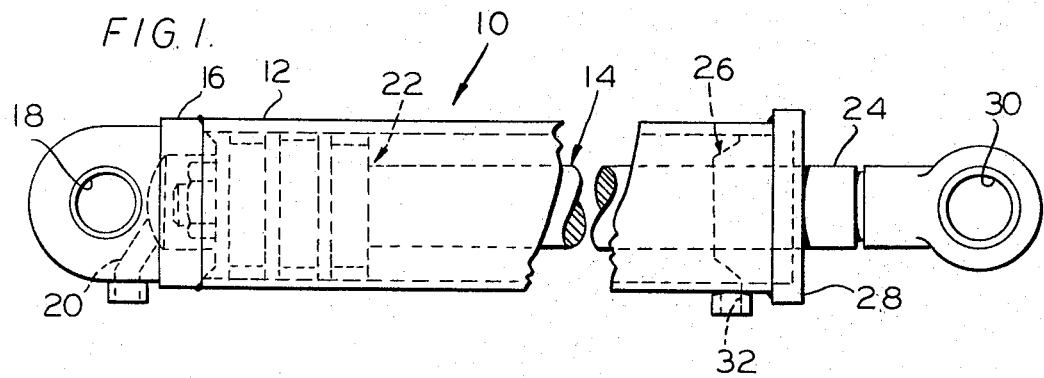
FIGURE 1 is a side elevation view, partially sectioned, of an hydraulic cylinder incorporating a piston head assembly embodying features of the present invention.

Referring now to the drawings FIGURE 1 illustrates an hydraulic cylinder indicated generally at 10. The cylinder 10 comprises a tubular member 12 having a piston rod assembly 14 mounted for reciprocating movement. At the head end of the cylinder an end casting 16 is secured to the end of the tubular member by suitable means such as welding. A bushing 18 may be provided to mount the head end of the cylinder to any desired implement through pin means (not shown). A passageway 20 is provided in the end casting to receive hydraulic fluid from conduits (not shown) of a conventional hydraulic control system. A passageway 32 is provided at the end of cylinder 10 remote from passageway 20 to admit fluid into the rod of the cylinder from conduits (not shown) of the control system.

Figure 2:
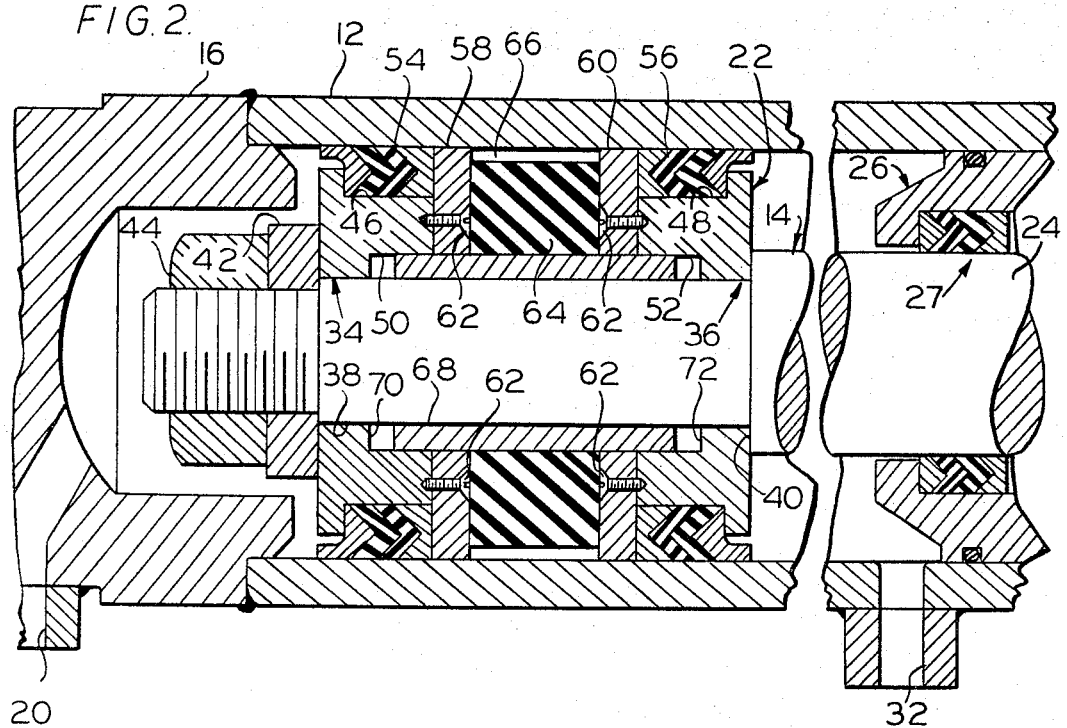
FIGURE 2 is an enlarged cross-sectional view of a portion of the hydraulic cylinder of FIGURE 1 showing the resilient piston assembly before admission of hydraulic fluid to the cylinder; and, FIGURE 3 is an enlarged cross-sectional view showing the piston head assembly at the end of a stroke as it cushions the load.

As illustrated in FIGURES 1 and 2 the piston rod assembly 14 comprises a piston head assembly 22 mounted at one end of a rod 24 slidably mounted within a gland 26 secured within the end of tube 12 by means of end plate 28. The gland 26 is provided with annular packing set 27 to seal the rod end of the cylinder. A bushing 30 may be provided at the free end of rod 24 for pivotal connection with the desired implement, such as a loader mechanism.

FIGURE 2 illustrates the piston head assembly 22 in its retracted position within cylinder 10 before admission of fluid under pressure to extend the rod. The assembly 22 comprises a pair of annular half piston heads 34 and 36 mounted for axial sliding movement on reduced portion 38 of rod 24. The piston head assembly is secured against shoulder 40 of the rod by means of washers 42 and nut 44 threaded on the end of the rod. The half piston heads 34 and 36 are formed with annular reduced portions 46 and 48, respectively, on their outer periphery and annular recessed portions 50 and 52, respectively, on their inner diameter. Annular V-shaped packing sets, or sealing rings 54 and 56 are each mounted on a respective reduced portion 46 and 48 of the half piston heads. The packing sets in turn are held in place by means of annular bearing rings 58 and 60, respectively. Each bearing ring is secured to a respective piston head by suitable fastening means, such as the bolts 62.

An annular resilient member 64 is mounted between the piston heads in contact with the opposing bearing rings 58 and 60. The resilient member is preferably formed of an elastomer material, such as rubber or urethane. The outer periphery of the resilient member is spaced inwardly from the surface of the tubular member 12 to provide an annular space 66 to accommodate expansion of the resilient member during absorption of shock loads.

A tubular stop member 68 is mounted for axial sliding movement on the reduced portion 38 within the annular space provided by the resilient member 64, the bearing rings 58 and 60, and recessed portions 50 and 52 of the piston heads. The ends of the stop member are spaced a predetermined distance from the corresponding shoulders 70 and 72 on the respective piston heads. The combined distance of this spacing determines the extent of travel of each piston head with respect to the other piston head and thus limits the amount of yielding of the resilient member 64. It is important to limit this yielding to prevent destruction of the resilient member. Thus, where extremely high pressures are developed, such as during "lock-up" of the cylinder, and without the stop member 68, the material of the resilient member would be unable to withstand the large compression forces and would extrude between the bushings and the tubular member 12.

In operation, assuming that the piston rod is initially in the position illustrated in FIGURE 2, fluid under pressure will be admitted into the head end of the cylinder through passageway 20. The fluid pressure will rise at a rapid rate and cause displacement of half piston head 34 to the right. Piston head 34 will slide in an axial direction with respect to reduced portion 38 while bearing ring 58 will deflect resilient member 64. As the resilient member absorbs the shock loads it will radially expand into the annular space 66. The resilient member will therefore cushion the hydraulic shock load from the sudden rise in pressure and minimize stresses in the piston rod. When the fluid pressure develops a force on the piston head 34 sufficient to overcome the load connected through rod 24, the entire piston rod assembly 14 will extend to the right. This extension will continue until fluid flow is terminated by the operator or until the piston head assembly 22 contacts the gland 26.

At the fully extended position of the cylinder as illustrated in FIGURE 3, and upon the piston rod assembly contacting the gland 26, the inertial forces of the combined implement and load mass moved by the rod will cause the rod force to change from compression to tension thus producing a mechanical shock load which is absorbed through greater deflection of resilient member 64. Where these inertial forces are of a large order the half piston heads 34 and 36 will move along the reduced portion 38 of the rod until shoulders 70 and 72 contact the stop member 68. This will limit the amount of yielding in the resilient member 64 and effect a rigid metal-to-metal contact from the gland 26, piston head assembly 22, washer 42, nut 44, and rod 24 to the implement. After a short period of time following full extension of the hydraulic cylinder the energy stored in resilient member 64 will operate to restore the half piston heads 34 and 36 to their initial positions illustrated in FIGURE 2. The piston head assembly 22 will now be effective to cushion both hydraulic and mechanical shock loads during retraction of the piston rod.

To retract the piston rod fluid under pressure is introduced into passageway 32 to act against half piston head 36. As the pressure rapidly rises the resilient member 64 will yield in the manner described above to cushion the hydraulic shock load. The piston rod will now retract until fluid flow is stopped or until the half piston head 34 contacts the end casting 16. The mechanical shock loads arising from the inertial forces of the mass of the load will be cushioned by the resilient member 64 as previously described. Yielding of the resilient member is limited when axial movement of the half piston heads 34 and 36 is stopped through contact with the stop member 68.

In view of the foregoing description, it is clear that there has been provided herein a new and improved hydraulic cylinder incorporating a resilient piston head assembly to cushion hydraulic and mechanical shock loads. Additionally there has been provided a reliable piston head assembly of simple construction which is effective to yieldably cushion hydraulic and mechanical shock loads and which incorporates means to limit the yielding of the resilient member of the piston assembly.

While the embodiment herein is at present considered to be preferred, it will be understood that numerous variations and modifications may be made by those skilled in the art and it is intended to cover in the appended claims all such variations and modifications as fall within the spirit and scope of the invention.

What is claimed is:

1. A piston head assembly for use with an hydraulic motor having a piston rod mounted for reciprocating movement within a cylinder and having one end adapted for connection with a load, the assembly including the combination of: first and second axially spaced piston head members positioned within the cylinder on an end of said rod, each head member being mounted for axial sliding movement to and from the other head member; resilient means mounted intermediate the head members to yieldably resist axial movement of each head member to the other head member; and other means positioned between the head members and movable relative to said members and said rod for stopping each head member after a predetermined axial displacement to the other head member to limit the amount of yielding of the resilient means.

2. The invention as defined in claim 1 wherein: the resilient means comprises an annular member concentric with the rod and having a pair of end surfaces, each end surface engaging an opposing surface of a respective head member.

3. The invention as defined in claim 2 wherein: the annular member is formed of an elastomer material.

4. The invention as defined in claim 1 wherein: the other means comprises a rigid axially extending stop member slidably mounted on the rod for movement between the head members of a distance equal to said predetermined displacement.

5. The invention as defined in claim 4 wherein: the stop member is formed with a cylindrical configuration concentric with the rod and slidably engaged at each end with an annular recess provided in the inner diameter of a respective head member.

6. The invention as defined in claim 4 wherein: the resilient means comprises an annular member concentric with the rod and axially slidable with respect to the stop member, the annular member having a pair of end surfaces, each end surface engaging an opposing surface of a respective head member.

7. The invention as defined in claim 6 wherein: the annular member is formed of an elastomer material.

8. The invention as defined in claim 6 wherein: the annular member is radially spaced from the inner surface of the cylinder providing clearance for outward expansion of the annular member.

9. The invention as defined in claim 5 wherein: the resilient means comprises an annular member concentric with and axially slidable on the stop member, the annular member having a pair of end surfaces, each end surface engaging an opposing surface of a respective head member.

10. The invention as defined in claim 9 wherein: the annular member is radially spaced from the inner surface of the cylinder providing clearance for outward expansion of the annular member.

References Cited

UNITED STATES PATENTS

| | | | |
|---|---|---|---|
| 546,441 | 9/1895 | Vogt | 92—84 |
| 560,918 | 5/1896 | Oderman | 92—84 |
| 1,162,562 | 11/1915 | Brown | 92—85 X |
| 2,755,779 | 7/1956 | Muller. | |
| 2,836,443 | 5/1958 | Farmer | 92—252 X |
| 3,158,072 | 11/1964 | Detrez | 92—249 X |

FOREIGN PATENTS

| | | |
|---|---|---|
| 164,019 | 7/1955 | Australia. |
| 740,711 | 10/1943 | Germany. |

MARTIN P. SCHWADRON, *Primary Examiner.*

I. C. COHEN, *Assistant Examiner.*